(12) United States Patent
Kondo et al.

(10) Patent No.: US 8,324,528 B2
(45) Date of Patent: Dec. 4, 2012

(54) FINE PROCESSING METHOD FOR A MATERIAL OF SINTERED DIAMOND WITH A LASER BEAM, A CUTTER WHEEL FOR A SUBSTRATE MADE OF A BRITTLE MATERIAL AND ITS PRODUCING METHOD THEREOF

(75) Inventors: Mikio Kondo, Kashiwara (JP); Kazuhisa Kuriyama, Suita (JP); Hiroshi Tomimori, Suita (JP)

(73) Assignee: Mitsuboshi Diamond Industrial Co., Ltd, Osaka (JP)

( * ) Notice: Subject to any disclaimer, the term of this patent is extended or adjusted under 35 U.S.C. 154(b) by 559 days.

(21) Appl. No.: 11/815,318

(22) PCT Filed: Feb. 2, 2006

(86) PCT No.: PCT/JP2006/301783
§ 371 (c)(1),
(2), (4) Date: Aug. 2, 2007

(87) PCT Pub. No.: WO2006/082899
PCT Pub. Date: Aug. 10, 2006

(65) Prior Publication Data
US 2009/0039061 A1    Feb. 12, 2009

(30) Foreign Application Priority Data
Feb. 2, 2005  (JP) .................... 2005-026710

(51) Int. Cl.
*B23K 26/38*  (2006.01)
(52) U.S. Cl. ......... 219/121.72; 219/121.69; 219/121.73; 219/121.85

(58) Field of Classification Search ............. 219/129.67, 219/121.73, 121.82
See application file for complete search history.

(56) References Cited

U.S. PATENT DOCUMENTS
4,401,876 A * 8/1983 Cooper .................... 219/121.69
(Continued)

FOREIGN PATENT DOCUMENTS
EP  0824990 B1  2/1998
(Continued)

OTHER PUBLICATIONS

Notice of Reasons for Rejection with English translation of JP Appln. No. 2007-501623 dated Sep. 21, 2010.

*Primary Examiner* — Henry Yuen
*Assistant Examiner* — Thien S Tran
(74) *Attorney, Agent, or Firm* — Antonelli, Terry, Stout & Kraus, LLP.

(57) ABSTRACT

The present invention provides a manufacturing method for accurate, fine and efficient processing of a work piece to be processed and prevention of graphitization of the work piece to be processed, when sintered diamond is processed by a laser beam.

The method provides process comprising steps of (a) irradiating outer circumference of a scribing wheel 2 with a laser beam from the side of the wheel, (b) moving the laser beam relative to the wheel 2, (c) forming continuously along the circumferential direction in the required space fine grooves with openings directed radially on a ridge site, (d) irradiating the laser beam onto the site to be processed at a speed of the laser beam relative to the work piece, and (e) forming the work piece into a minute shape within a depth of less than 200 μm.

16 Claims, 14 Drawing Sheets

U.S. PATENT DOCUMENTS

| | | | |
|---|---|---|---|
| 4,628,573 A * | 12/1986 | Hamada et al. | 29/25.35 |
| 5,225,650 A * | 7/1993 | Babel et al. | 219/121.69 |
| 5,331,131 A * | 7/1994 | Opdyke | 219/121.69 |
| 5,471,970 A * | 12/1995 | Sakarcan | 125/15 |
| 5,836,229 A * | 11/1998 | Wakayama et al. | 83/886 |
| 6,903,304 B1 * | 6/2005 | McLellan et al. | 219/121.69 |
| 2002/0125232 A1 * | 9/2002 | Choo et al. | 219/121.69 |
| 2004/0258108 A1 * | 12/2004 | Iehisa | 372/25 |
| 2005/0028389 A1 * | 2/2005 | Wort et al. | 30/346.54 |
| 2006/0051045 A1 * | 3/2006 | Qiu et al. | 385/137 |

FOREIGN PATENT DOCUMENTS

| | | | |
|---|---|---|---|
| JP | 02-280983 | | 11/1990 |
| JP | 07-156003 A | | 6/1995 |
| JP | 3074143 | | 6/2000 |
| JP | 2003-039327 | * | 2/2003 |
| JP | 2003-062683 | | 3/2003 |
| JP | 2003-039327 | * | 5/2003 |
| JP | 2003-062683 | * | 5/2003 |
| JP | 2004-359502 | * | 12/2004 |
| JP | 2004-0359502 | * | 12/2004 |

* cited by examiner

Fig.7
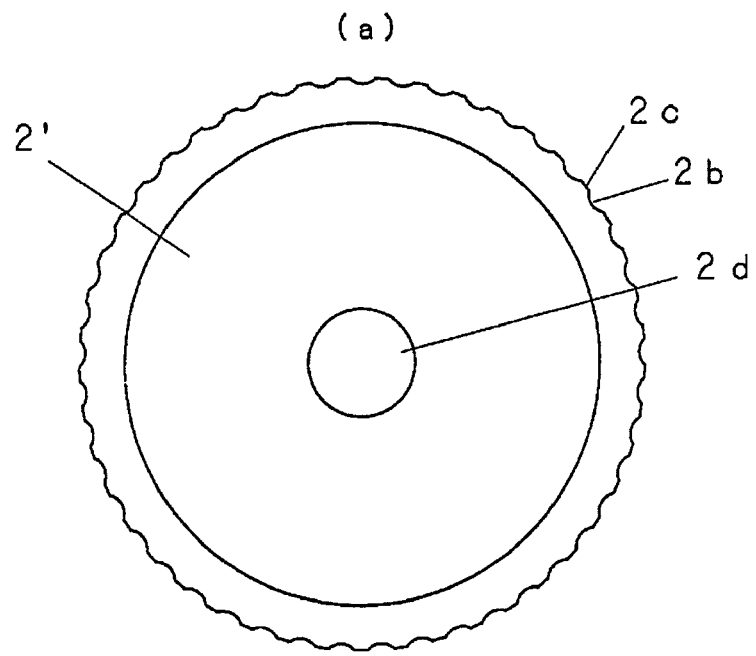
Fig.8
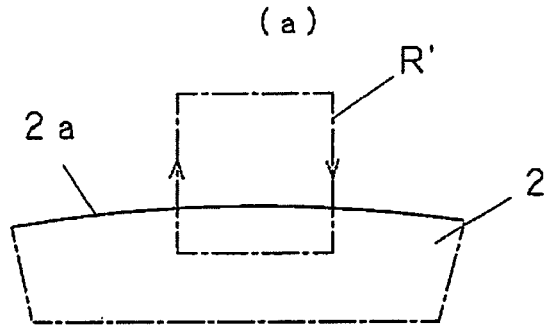
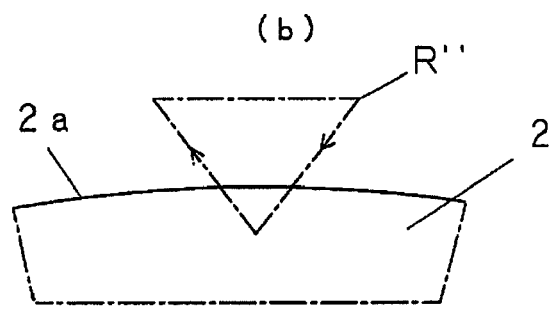

Fig.9
(a)
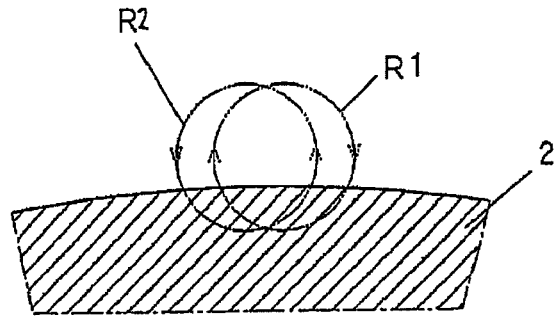
(b)
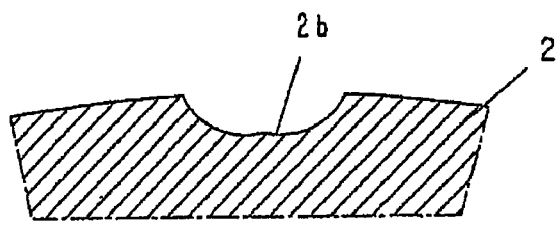
(c)
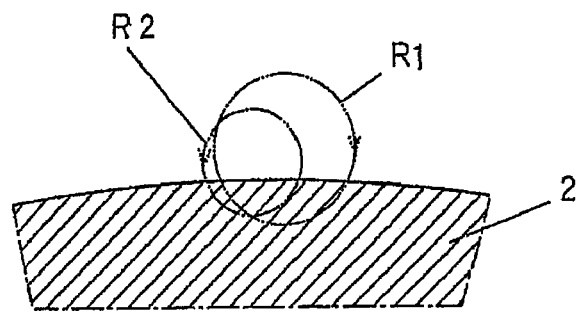
Fig.10
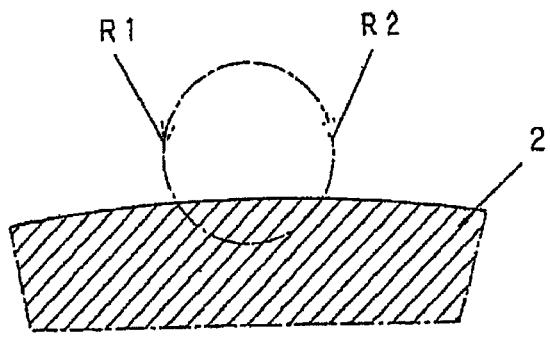

Fig.13
(a)
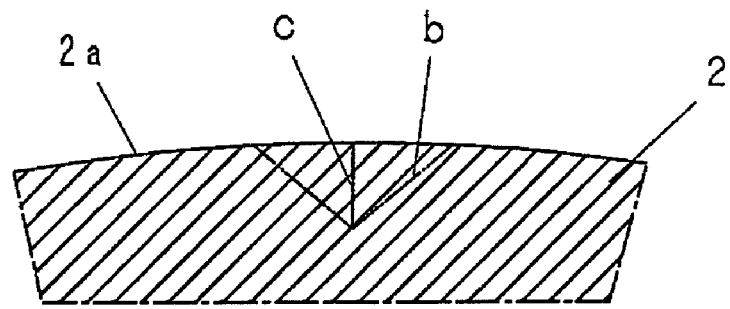
(b)
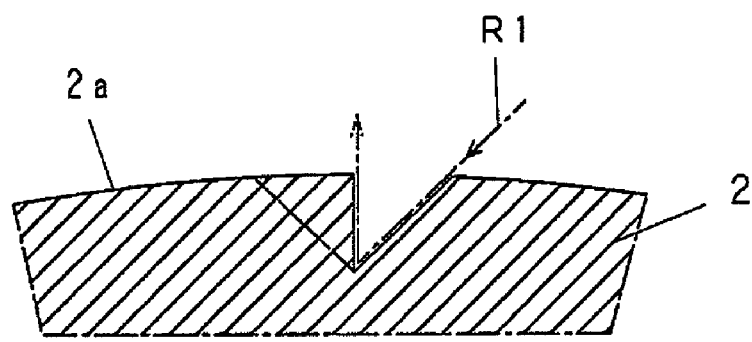
(c)
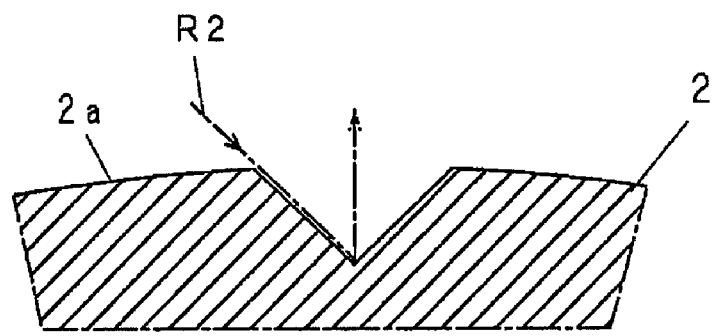

Fig.16 (a) (b)
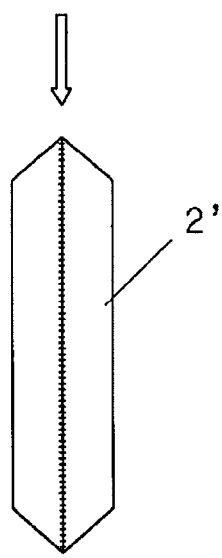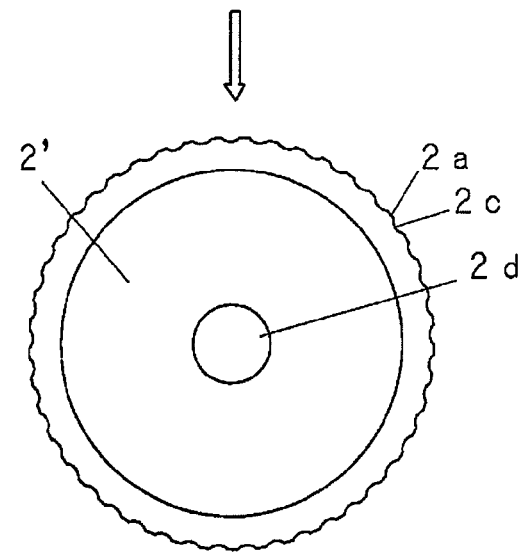
(c)
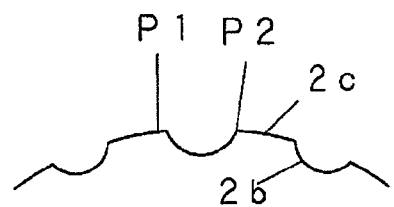

Fig.17
(a)
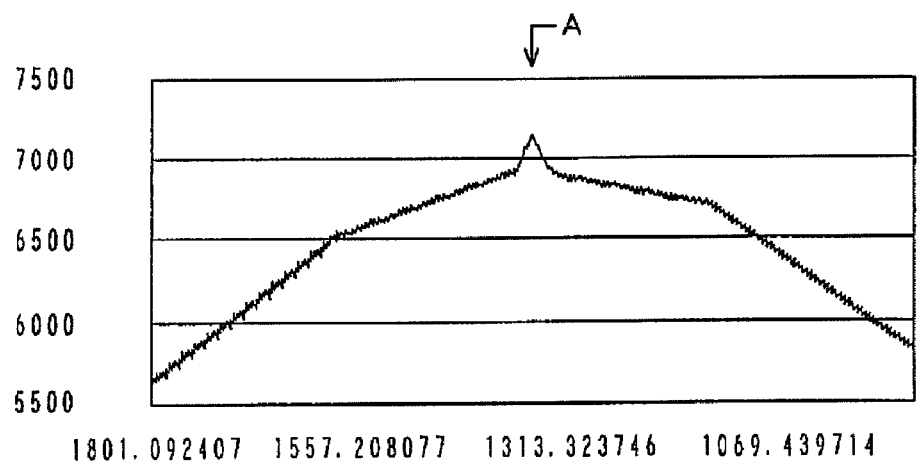
(b)
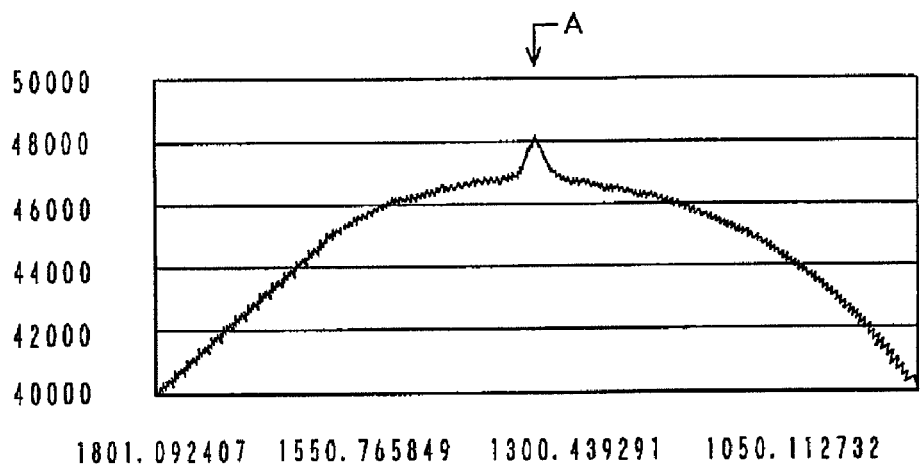

Fig.18
(a)
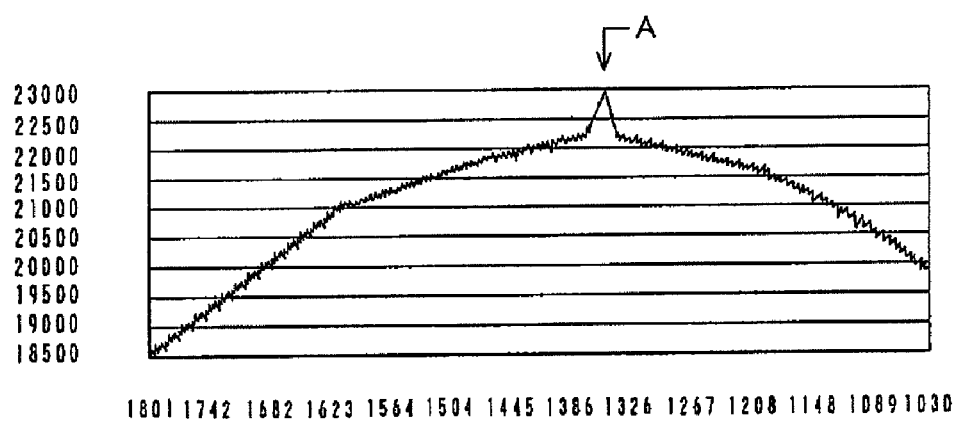
(b)
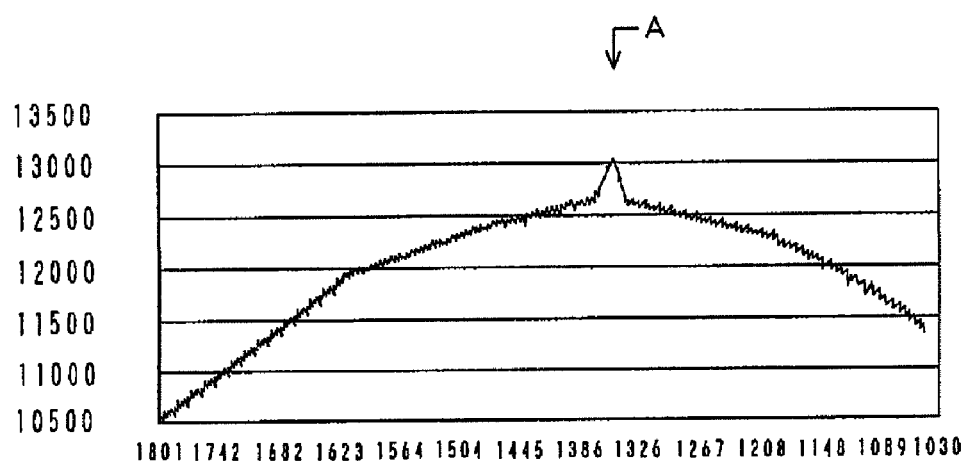

Fig.23
(a)
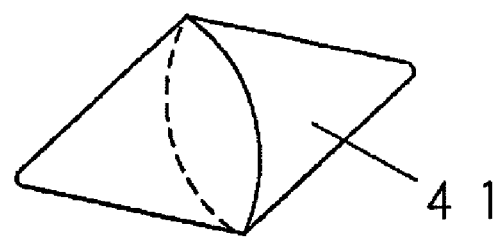
(b)
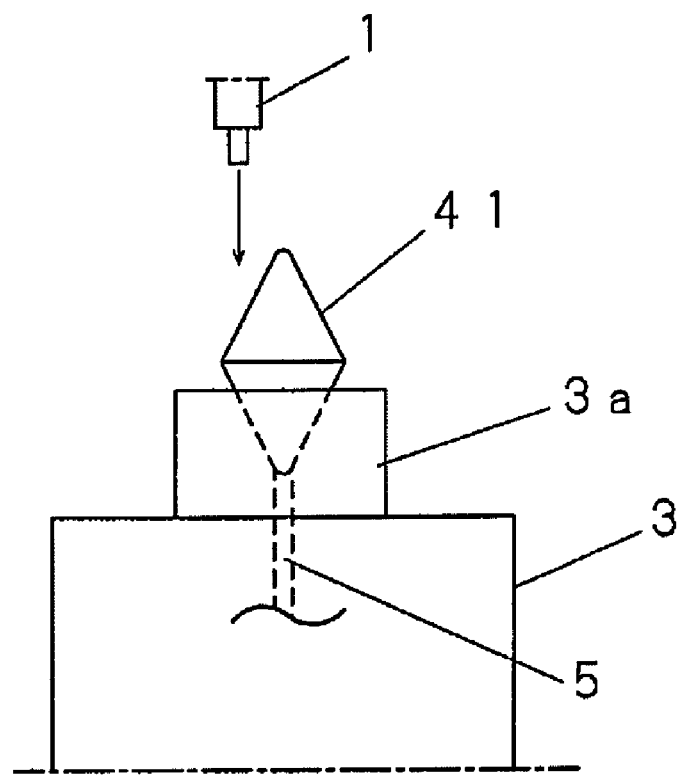

FINE PROCESSING METHOD FOR A MATERIAL OF SINTERED DIAMOND WITH A LASER BEAM, A CUTTER WHEEL FOR A SUBSTRATE MADE OF A BRITTLE MATERIAL AND ITS PRODUCING METHOD THEREOF

TECHNICAL FIELD

The present invention relates to a fine processing method for a sintered diamond with a laser beam; in particular to a processing method of a cutter wheel for forming a scribing line on a substrate made of glass, ceramics, mono-crystal silicon or sapphire when they are scribed and broken; and to a cutter wheel which is produced by this method.

BACKGROUND TECHNOLOGY

Generally, when a substrate made of such a brittle material as glass is scribed and broken, it is widely used to form a scribing line on the surface of a substrate by rolling a cutter wheel in close contact with the substrate surface, and to break the substrate by generating a crack in the direction of thickness of the substrate along the scribe line. The scribing and breaking for a brittle material is hereinafter referred to as "cutting" for short.

The cutter wheel for scribing a substrate is made of a cemented carbide and sintered diamond, especially a cutter wheel made of sintered diamond is widely used in view of life of a cutter. Such a cutter wheel (hereinafter referred to as "wheel" in this invention) has a peripheral ridge extending equiangularly, i.e. cutting edges, and has a penetrating axis hole by which the wheel is supported rataionally on a substrate. Further, outer diameter is sometimes set to be 2 to 3 mm in order to increase load per unit area at the contact point of cutter of the surface of a substrate.

On the other hand, the present applicant has filed a patent application for a wheel which has contiguous protrusions and grooves with a predetermined space therebetween in the circumferential direction on the cutter (cf. Patent Reference 1).

According to this patent, when a scribe line is formed on the surface of a substrate by protrusions of a cutter, a deep vertical crack can be formed in the direction of thickness of the substrate and at the same time slip at the moment of rolling the wheel can be effectively prevented. The above-mentioned protrusions and grooves are machined with a diamond wheel. The "diamond wheel" is a grindstone specified in JIS-B4131 in the broad sense of the term. In order to avoid confusion with the term "wheel" (a cutter wheel) in this invention, it is hereinafter referred to as "grindstone".
[Patent Reference 1]
Japanese Patent No. 3074143

DISCLOSURE OF THE INVENTION

Problem to be Solved by the Invention

Peripheral parts of a grindstone used herein, however, should be made in a fine shape, if protrusions and grooves with fine pitches on a wheel with outer diameter 2 to 3 mm, as mentioned above, are required, and it takes too much time to form an edge shape for the grindstone, and the life of a grindstone also influences much.

On the one hand, laser processing is used as a means of fine processing. To machine rough shape of diamond dies by a laser beam was introduced in the latter half of the 1960s and has been put to practical use through ruby laser, YAG laser, $CO_2$ laser. A laser beam has been widely used from the stage of original rough processing to the stage of fine processing.

And yet at the same time, when sintered diamond is worked out by a laser beam, the processing site of sintered diamond suffers from graphitization due to the heat of laser irradiation. Such graphitization did not really matter with rough processing, but will have problems with fine processing.

With that in mind the object of this invention is to prevent graphitization of processing site generated at the time of fine processing of sintered diamond by a laser beam and to provide a method by which accurate and high efficient fine processing can be obtained.

And another object of the invention is to provide a method for a solution of the following problems. FIG. 21 shows a conventional method for processing circular arc grooves by use of irradiation of a laser beam.

As can be seen in FIG. 21, phenomenon called as "asymmetry" is observed at the edge 'a' of the protrusion part on the end side of processing, when grooves are processed by a laser beam relatively moving in the direction of an arrow of the figure in a circular pattern along the predetermined orbit of chain line from the wheel side along the ridge of the wheel. In the processing site of grooves of wheel 2 this 'asymmetry' is the phenomenon in which a shape of the groove is formed asymmetric with respect to a center line C on the both starting and ending sides. In addition, solid line at the edge 'a' of protrusions and chain line in the drawing are a moving trajectory of the laser beam, and short dashed line shows the shape of real processing.

This is attributed to the fact that thickness of processing site changes along the moving trajectory of a laser beam. The existence of such asymmetry is likely to cause deterioration in quality and function at the time of forming scribe line by fine protrusions and grooves. The above 'wheel side' means the front surface and the back surface of a wheel, including an opening of a wheel axle hole.

It is also an important object of the invention to provide a processing method so as not to have such a defect as the above, as well as to provide process of protrusions and grooves with a fine pitch by a laser beam.

As can be seen in FIG. 22, when protrusions and grooves are processed by the laser beam irradiation from the side of wheel so that they may be parallel to axis line X against the wheel, a defective dent called as "a scooped hollow" is found on the upper bevel part irradiated with a laser beam which forms ridge 2a. This "scooped hollow" is the phenomenon caused by that the processing site and non-processing sites of a work piece are mixed together on the side of laser beam injection and boundaries of the both sites are unclear.

It is also one of objects of the invention to provide a method having no defect such as "scooped hollow" at the time, when protrusions and grooves with a fine pitch are made by a laser beam.

It is another object of the invention to provide such wheels for substrates made of a brittle material as a V-shaped ridge, the top of which works as a cutter, is formed on the circumference of the wheel, a plurality of tiny protrusions and grooves are formed alternately around the entire circumference of ridge by a laser beam.

Means for Solving the Problems

In order to achieve the above purpose the following technical measures are taken in this invention, i.e. a fine processing method according to the present invention for sintered diamond by a laser beam, is a method characterized in that a work piece is made into finely processed form, while the laser beam is irradiated relative to the work piece made of a brittle material so that maximum thickness of the work piece should be in the range of no more than 200 μm. A laser beam with a wavelength of 125 to 1066 nm, a pulse width of 5 f (femto) second to 50 n (nano) second and a repetition cycle of 300 Hz to 5 KHz is used.

A method in accordance with the present invention for manufacturing scribing wheels for substrates made of a brittle material is characterized in the following producing steps. (1) A wheel provided with a V-shaped ridge, which is made of sintered diamond and the top thereof works as a cutter of a scribing wheel, is further processed; (2) the ridge of the wheel is irradiated with a laser beam along the outer circumference of the wheel, including this ridge, from the side of the wheel while moving the laser beam relative to the wheel; (3) fine grooves opened radially and at a predetermined interval in the circumferential direction are continuously formed; and (4) maximum thickness of processing site is within 200 μm while irradiating the laser beam moving relatively to the wheel onto the processing site. The applicable laser beam is preferable with a wavelength of 125 to 1066 nm, a pulse width of 5 f (femto) second to 50 n (nano) second and a repetition cycle of 300 Hz to 5 KHz.

Kinds of a laser beam used in this invention are not limited, if they have a shortwave length and/or a short pulse. But YAG 5th harmonic (wavelength of 212 nm), YAG 4th harmonic (266 nm), YAG 3rd harmonic (355 nm) and YAG 2nd harmonic (533 nm), which are all based on the fundamental wavelength (1,064 nm), are preferable for the purpose of processing of good quality.

Displacement of a laser beam in the invention is relative to a work piece, i.e. to a wheel, in this connection it is acceptable to fix the wheel and move the laser beam, or both of them are movable and may be moved selectively in accordance with the precision that is required to proceeding site.

A relative moving speed of 0.1 μm/sec to 3.0 mm/sec is more preferred from a practical standpoint.

The laser beam and the work piece are to be displaced relative to the wheel along a same figure pattern, and the depth of grooves is aligned by sliding the figure drawn in accordance with the moving trajectory of the laser beam in the radial direction of the wheel, the length of circumference of grooves is aligned by changing the size of the figure drawn in accordance with the moving trajectory of the laser beam. Therefore, XY-stage displacement program in a control part can be set without large change per size of a wheel.

The figures drawn in accordance with the moving trajectory of the laser beam. are not limited, i.e. an enclosed shape like a circle, an ellipse, a polygon, such a shape which dose not form closed curve as a parabola, a hyperbola and a straight line are all possible.

It is also effective to this invention to process the part of a groove first by moving a laser beam from the part corresponding to one edge of the groove required to be processed to the wheel in one direction, then by moving the laser beam in the direction opposite to the first direction from the other part corresponding to other edge of an unfinished groove. Herewith this prevents from forming "asymmetry" at the edge of ending point of processing site and forms sharp-cut accurate protrusions.

The prevention of phenomenon "asymmetry" can be achieved by sliding trajectory of relative movement of a laser beam in the circumferential direction of a wheel as a closed curve of circular or polygon and irradiating with the beam at the first and second irradiations.

As an alternative, it may be possible to prevent the phenomenon "asymmetry" by dividing the processing line of groove to be processed into two at the boundary of line proposed and by irradiating the separated parts with the first and second laser beam respectively.

Left-right symmetry of protrusions and grooves is attainable by irradiating with a laser beam from both sides of a wheel alternately or at one time, when outer circumference of a wheel including its ridges is moved relative to the wheel and is irradiated with a laser beam from a wheel side. In this case it is useful to process with the prescribed gradient so that radiation direction of the laser beam irradiated from both sides of the wheel may come close to axis line of the wheel. Herewith existence of above-mentioned "scooped hollow" can be completely avoided. at the time of irradiation of the laser beam.

A laser beam used in this invention forms grooves by a laser ablation method. The laser beam with a short pulse and/or a short wavelength has a high power density, and substances formed at an irradiation place can be scattered in all directions before the irradiated place of the wheel is heated by a laser beam. The laser ablation means the process in which there is little melting process and processing site is instantaneously evaporated by the combination of wavelength of laser, pulse width, power density. For this reason non-proceeded site can be free from heat affect.

This invention is also characterized by providing a wheel for a substrate made of a brittle material with a peripheral ridge which have more accurate protrusions and grooves with more microscopic pitches in comparison with those by a conventional processing method by a grindstone.

This invention is also characterized in that uniformity of an energy distribution in the outer cross-section perpendicular to the optical axis of a laser beam is measured and a work piece is processed by using the specific position of the outer part of the laser beam in accordance with the measurement result. This avoids fluctuation of processing arising from non-uniformity of the energy distribution in the outer cross-section perpendicular to the optical axis of a laser beam.

In addition, it is preferable that "the specific position of the outer peripheral part of the laser beam" corresponds to a place where the energy distribution is uniform and the curvature thereof is constant.

Advantageous Effect of the Invention

A method for manufacturing a cutter wheel for a substrate made of a brittle material according to the invention, prevents the graphitization of processing sites during the period of processing sintered diamond, and makes it possible to provide accurate and efficient fine processing In addition, it is also possible to process wheels with such more accurate and fine ridges working as cutting edges of wheels as can not be obtained by a conventional grindstone.

Furthermore, it is easily possible to control the depth of grooves to be processed merely by sliding figures drawn in accordance with the moving trajectory of a laser beam, and easily to control length of circumferential direction by changing the size of figures drawn in accordance with the moving trajectory of the laser beam.

The method prevents "asymmetry" at the edge of ending point of processing site of grooves and forms sharp-cut accurate protrusions. Besides, the method makes an effect on production of accurate wheels without phenomenon "scooped hollow" which occurs often when ridges are irradiated with a laser beam.

It is possible to draw the required moving trajectory on a wheel by accurate relative displacement of a laser beam in the following construction: the wheel is supported by use of a supporting means equipped with such three sites as the site roughly adjusting movement of a wheel movable in the direction of at least two axes, the site finely adjusting movement of the wheel movable in the direction of at least two axes on the above-mentioned rough adjusting and the rotary supporting site of the wheel movable at required angle, and then the laser beam is irradiated onto the processing site, while moving the laser beam relative to the wheel.

BRIEF EXPLANATION OF FIGURES

FIG. 7 Finished wheel;
(a) whole wheel (b) enlarged substantial part

FIG. 8 Examples of changed trajectory of a laser beam;
(a) square trajectory (b) triangle trajectory FIG. 9 Drawings which show embodiments for preventing "asymmetry" phenomenon, in accordance with the present invention;
(a) positional relation between the trajectories of the first and second irradiations of a laser beam and a wheel;
(b) example showing the smaller trajectory of the second irradiation of a laser beam than trajectory of the first irradiation FIG. 10 View of one embodiment showing the prevention of phenomenon "asymmetry".

FIG. 13 View same as FIG. 11 in case of triangle trajectory of a laser beam.

FIG. 16 Views showing measurement points in accordance with a Raman spectroscopic analysis in an example of experiment.

FIG. 17 Views showing experimental results of a Raman spectroscopic analysis on wheels formed by a conventional grinding method FIG. 18 Views showing experimental results of a Raman spectroscopic analysis on wheels formed by the laser processing according to the present invention.

EXPLANATION OF NUMERAL SYMBOLS

| | |
|---|---|
| 1 | Laser head |
| 2, 2' | Wheel |
| 2a | Ridge of a wheel |
| 2b | Groove of a wheel |
| 2c | Protrusion of a wheel |
| 3 | Fixed base |
| 3a | X-Y axis moving stage of a fixed base |
| 3b | Shaft supporting a wheel |
| 5 | Suction pipe |
| 31 | Moving stage for rough adjustment (Rough adjustment moving part) |
| 32 | Moving stage for fine adjustment (Fine adjustment moving part) |
| 41 | Wheel |
| b | Processing contour line of groove |
| c | Expecting line to be divided |
| R, R', R" | Moving trajectory of a laser beam |
| S | Line showing direction of irradiation of a laser beam |
| A | Raman shift of diamond |
| B | Raman shift of graphite |

PREFERRED EMBODIMENT OF THE INVENTION TO BE PUT INTO PRACTICE

Figure 1:
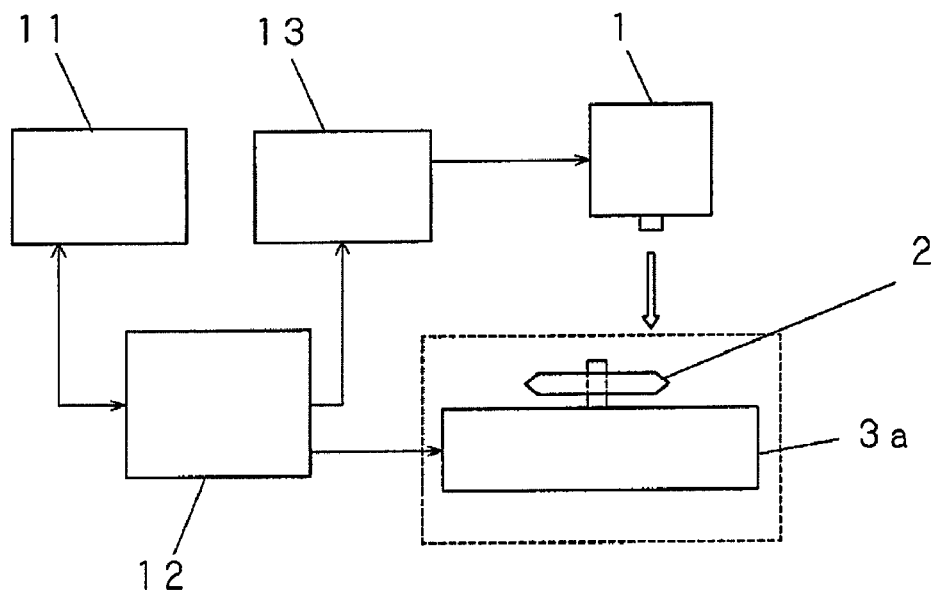
FIG. 1 Schematic system configuration for executing a manufacturing method according to the present invention.
Figure 2:
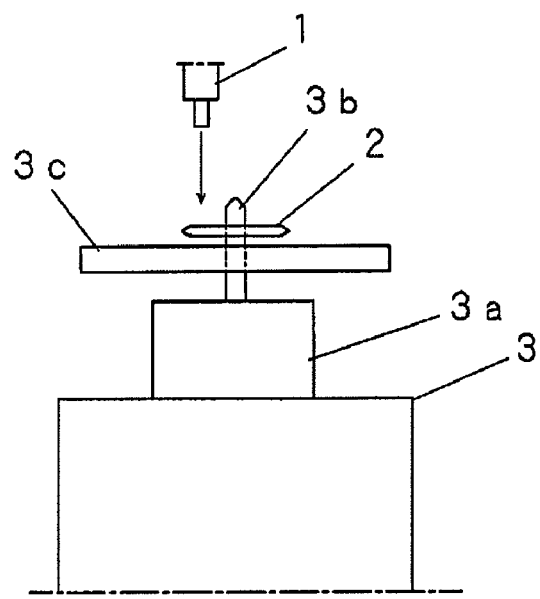
FIG. 2 A drawing of a base part holding a wheel to be processed and a laser head.

Preferred embodiments of a method for manufacturing wheels for substrates made of brittle materials in accordance with the present invention will be concretely described with reference to the drawings. FIG. 1 is a view showing a rough system configuration of the present invention to be executed. FIG. 2 is a view showing a base part for holding a scribing wheel and a laser head.

As shown in FIG. 1, the system configuration comprises a control unit 12 with a monitor 11, a laser source 13 controlled by the control unit 12, a laser head 1 irradiating a laser beam from the laser source 13, and a fixed base 3 with a stage 3a moving in the X-Y axis directions which supports a wheel 2 to be processed.

The stage 3a moving in the X-Y axis directions is so constructed that it can move in the X-Y axis directions on a horizontal plane in FIG. 2, and by the moving stage with Z-axis direction (not shown in the figure) the laser head 1 is so constructed that it can move in the vertical direction and irradiation angle of the laser beam can be adjusted. The wheel 2 is held by a rotational shaft 3b set on the stage 3a. The moving speed relative to the laser head 1 as well as the moving stage 3a are controlled by the control unit 12 including a computer. Reference numeral 3c is a white ceramic plate set under the wheel 2 to facilitate focusing.

In the embodiment of the invention a laser beam irradiated from the laser head 1 is a high harmonic wave of YAG laser, but kinds of a laser beam are not limited, if they are of a shortwave length and/or a short pulse. If a laser in wavelength of 125 to 1066 nm, a pulse width of 5 f second to 50 n second and a pulse repetition frequency of 300 Hz to 5 KHz. is used, any kinds of laser is applicable.

And maximum thickness of the processing site of a work piece irradiated with a laser beam from the laser head 1 is controlled to be no more than 200 μm. Minimum thickness of processing site is not limited, as long as the work piece can be processed. In addition, the range of 1 to 200 μm is more preferable in terms of processing availability. Relative moving speed of the wheel 2 and the laser head 1 is controlled lower than 3.0 mm/sec. The lower limit of moving speed is not limited and any speed is acceptable, unless long processing time causes any problem from a practical standpoint. It is more preferable to control the speed within 0.1 μm to 3.0 mm/sec.

Substantial output power of the laser beam irradiated from the laser head 1 is in the order of 0.002 W to 5.0 W. The control unit 12 controls a wavelength of the laser beam, a pulse width and a power density, and makes the laser source 13 irradiate the pulse laser beam that is most suitable for a laser ablation method.

"Movement of the laser head 1" described below means a relative movement of the stage 3a in the X-Y axis direction which holds the laser head 1 irradiating with the laser beam, and the wheel 2 to be processed. "Moving trajectory of the laser beam" described below means the trajectory of the laser beam formed by a relative movement of the laser head 1 and the stage 3a moving in X-Y axis directions The scribing wheel according to the present invention is a scribing wheel obtained by further processing a conventional scribing wheel used for a scribing operation for the purpose of forming a scribe line in a brittle material to be cut for processing a brittle material, in order to improve the scribing capability. In other words, a conventional scribing wheel is finely processed at the peripheral ridge so as to form a plurality of protrusions and grooves. A conventional scribing wheel is produced by grinding a disc with a grindstone so as to form a ridge which serves a scribing function and which is made by beveled surfaces extending outwards. In the process of the grinding operation irregularities of uneven are formed on the peripheral beveled surfaces and the ridge. It is obvious that the surface irregularities are not of regular pitches nor reproducible. Contrary to the conventional wheel, it is possible to provide a scribing wheel superior in scribing capability by finely processing a conventional wheel at the ridge so as to form protrusions with a predetermined height and grooves with a predetermined width and a depth. Such geometrical dimensions are suitably selected in accordance with an outer diameter of the wheel.

In a scribing performance for a glass substrate by the conventional wheel provided with surface irregularities due to grinding, is only capable of generating a vertical crack of a depth of 10 to 15% of the glass substrate. On the other hand, a scribing wheel according to the present invention has a feature that it is provided with protrusions and grooves at the peripheral ridge and that a large load is exited locally at the protrusions due to the face that the scribing pressure is concentrated at the protrusions. Therefore, when the scribing wheel according to the present invention is rolled on a glass substrate, a vertical crack is generated continuously below a formed scribe line. The vertical crack reaches inside the glass substrate to a depth of more than 80% of the thickness of the glass substrate. Consequently, if the wheel according to the present invention is utilized instead of the conventional wheel for cutting a substrate of a brittle material, then a breaking process usually necessary after scribing can be simplified or dispensed with, although it depends on a material and a thickness of the substrate. This provides a simplified equipment for cutting a brittle substrate without a breaking step. Accordingly, if a production equipment for FPD (Flat Panel Display) production is constructed by employing a scribing machine utilizing the wheel according to the present invention, it is possible to construct a more cost-saving equipment without a breaking machine.

Figure 3:
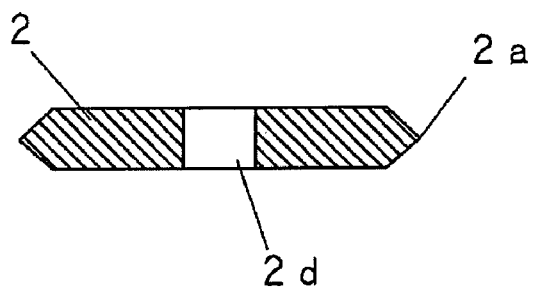
FIG. 3 Cross section of a wheel to be processed.
Figure 4:
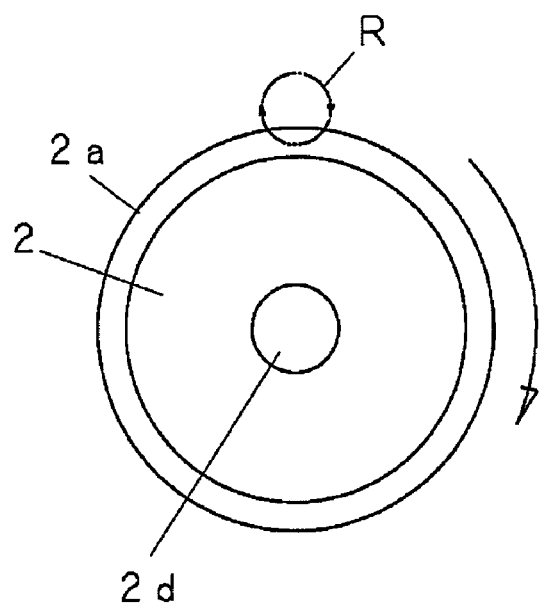
FIG. 4 Illustration diagram showing one embodiment of a manufacturing method according to the present invention and positional relation between trajectory of a laser beam and a wheel.

When production of the wheel according to the present invention starts, as shown in FIG. 3 and FIG. 4, a conventional wheel 2 is additionally processed at a V-shaped ridge 2a, a top thereof works as a cutter. The ridge 2a is formed along a direction of circle on the outer circumference of the wheel 2 of a disc made of sintered diamond. The wheel 2 is placed at a rotational shaft 3b in a horizontal position through a shaft hole 2d. A laser beam is irradiated, moving along the trajectory of a circle R towards outer circumference of the wheel 2 including the ridge 2a from the side of wheel 2 which stands still.

Figure 5:
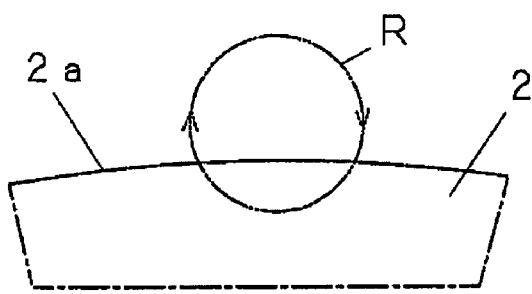
FIG. 5 Enlarged view of a substantial part of FIG. 4.
Figure 6:
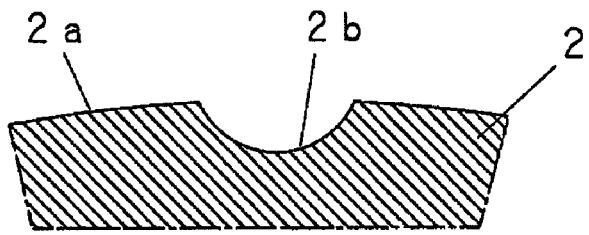
FIG. 6 Enlarged cross-sectional view showing a processed groove.

In this case, as shown in FIG. 4 and FIG. 5, a part of circular trajectory should be set so as to get in touch with ridge 2a. By this touch such a circular arc groove as is shown in FIG. 6 is obtained. Then axis 3b shown in FIG. 2 is rotated by a predetermined angle (one pitch) on the base of prepared parameters, and the part is irradiated with a beam, which is repeated sequentially and a wheel 2 with many fine protrusions 2c and grooves 2b is manufactured.

Fine adjustment of depth H of groove 2b to be processed is possible by sliding the figure drawn in accordance with the moving trajectory of a laser beam in the radial direction and fine adjustment of length of circumferential direction is possible by changing the size of figures drawn in accordance with the moving trajectory of the laser beam.

The above-mentioned trajectory of the laser beam is not limited to such a circle as shown in FIG. 4, i.e. tetragon in FIG. 8(a), triangle In FIG. 8(b), enclosed shapes such as polygon, curve which dose not form polygon and straight line are possible. In addition, it is also possible to make one processing of groove in several different combinations with these figures. In these cases fine adjustment of depth of groove is possible by sliding the figure drawn in accordance with the moving trajectory of a laser beam in the radial direction and fine adjustment of length of circumferential direction is possible by changing the size of figures drawn in accordance with the moving trajectory of a laser beam.

FIG. 9 to FIG. 13 show embodiments to prevent "asymmetry" occurring at the edge of ending point of laser processing site, which is described in each paragraph of [0005] respectively.

In the embodiment in FIG. 9 it is shown to process a part of a groove first by moving a laser with a circular trajectory in FIG. 9(a) from the part corresponding to one edge of the groove required to be processed in one direction to the wheel and irradiating R1 the part with a laser beam and then to finish production of one groove 2b by moving the laser beam in the direction opposite to the first direction from the other part corresponding to other edge of unfinished grove, as shown in FIG. 9(b). In this case it is better to make a smaller trajectory as a second laser beam than trajectory of the first laser beam, as shown in the FIG. 9(c). This speeds up irradiation time of the laser beam.

And as shown in FIG. 10, it is possible to process a part of a groove by the first irradiation R1 of a laser beam moving along a circular trajectory from the part corresponding to one edge of the groove required to be processed in one direction to the wheel and then by the movement of the second irradiation R2 of the laser beam so that the trajectory of the laser beam can lie in the same position as the first trajectory to the wheel 2 and also by the movement of the laser beam so that the first moving direction of the laser beam at the time of irradiation R1 and the second moving direction of the laser beam at the time irradiation R2 can be in the opposite direction to each other. This eliminates the above-mentioned asymmetry.

Figure 11:
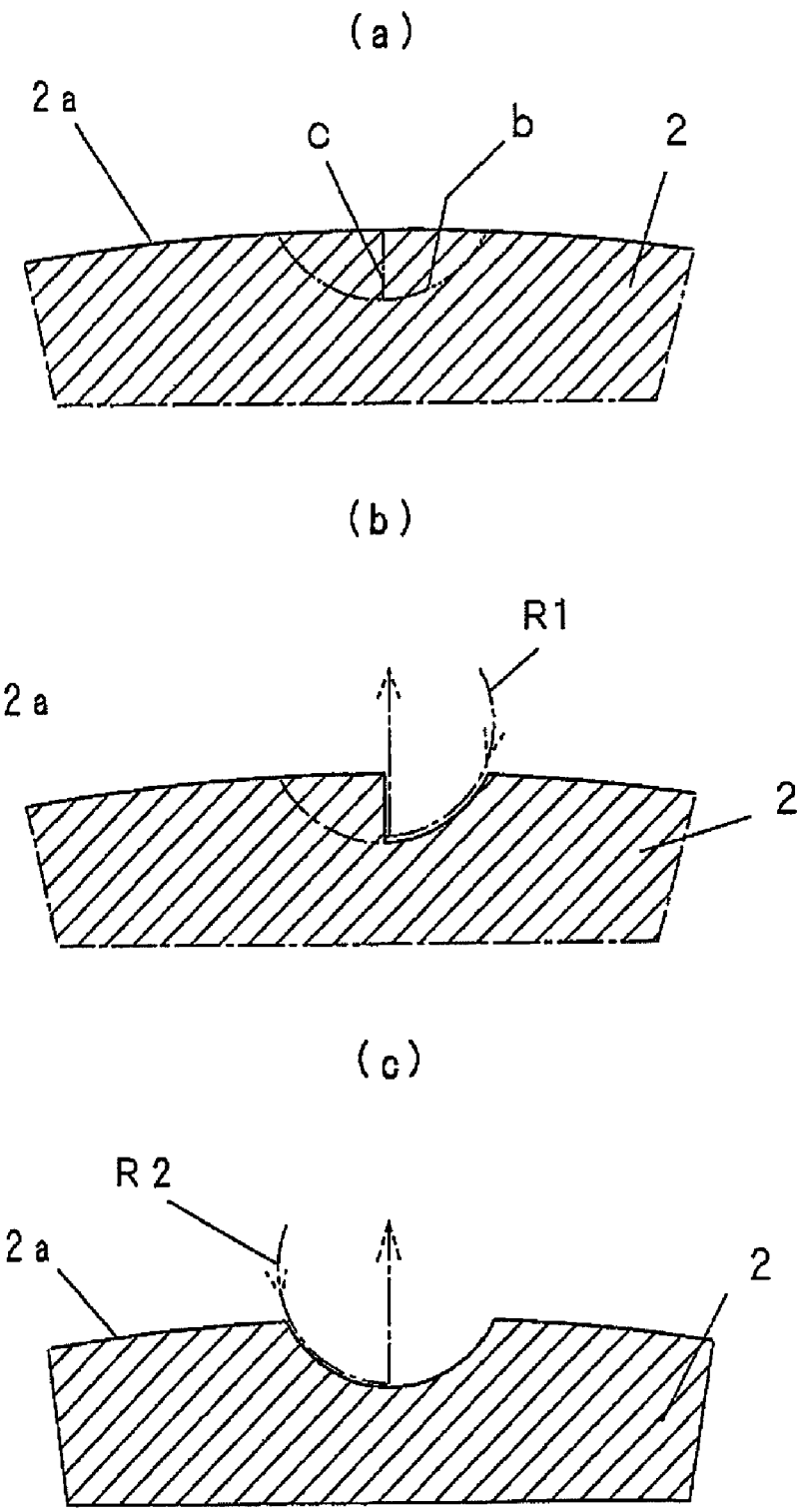
FIG. 11 Views of the other embodiment showing a manufacturing method claimed in the invention;
(a) a view showing processing border parting line of a groove;
(b) a view showing the first irradiation of a laser beam; and
(c) a view showing the second irradiation of the laser beam.
Figure 12:
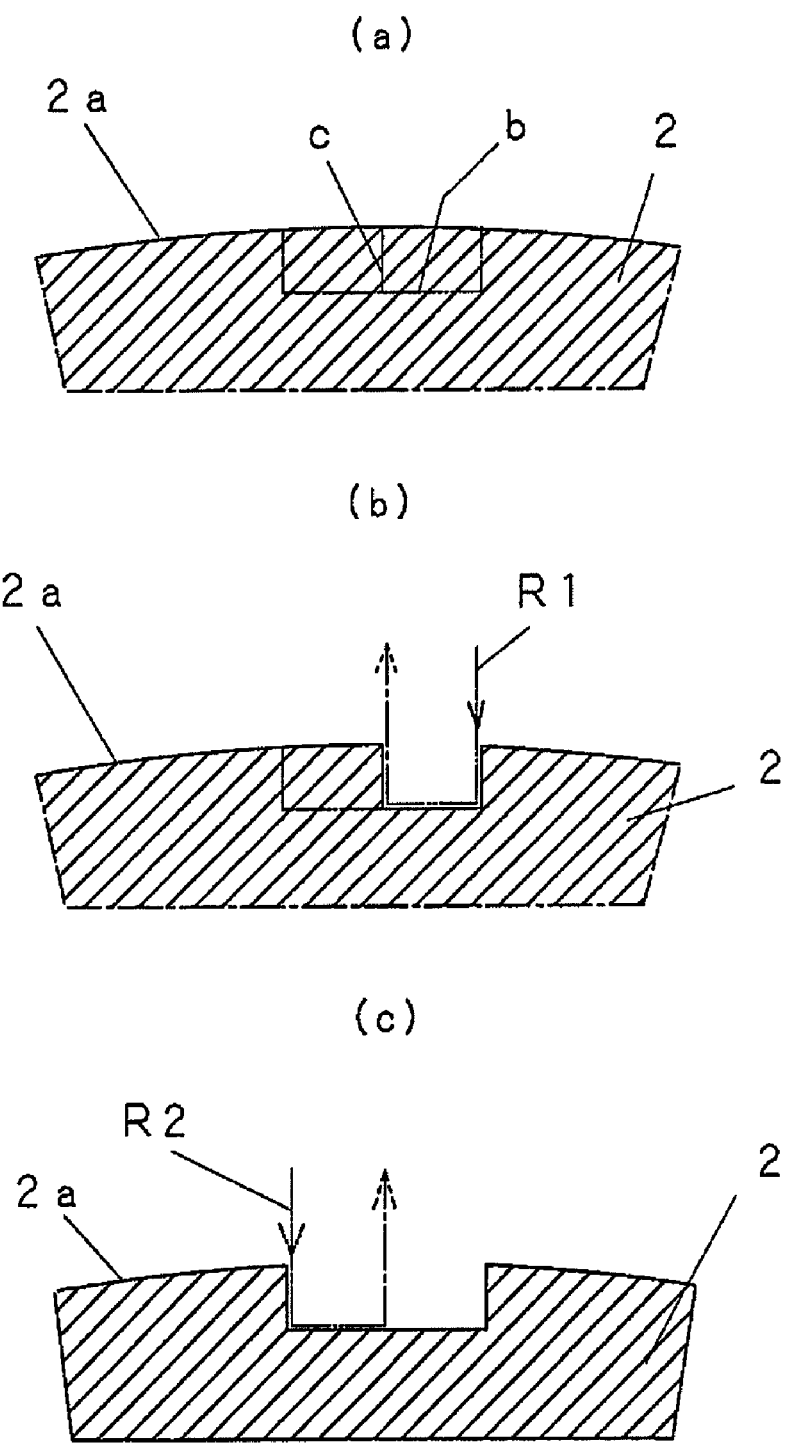
FIG. 12 View same as FIG. 11 in case of square trajectory of a laser beam.

In the embodiment shown in FIG. 11 a boarder line b of a groove to be formed is divided into two parts with respect to the dividing line c and the divided parts are processed so as to be irradiated by the first and the second laser beams. Embodiment in FIG. 11 shows that shape of groove 2b to be processed is circular arc, while in FIG. 12 the shape of groove 2b is a rectangular shape without one side and the opening portion is in the upward direction. In FIG. 13 the form of groove 2b is V like-shape. In both cases the parts divided into two by the processing boarder line b are processed by the first and second irradiations of a laser beam.

Figure 14:
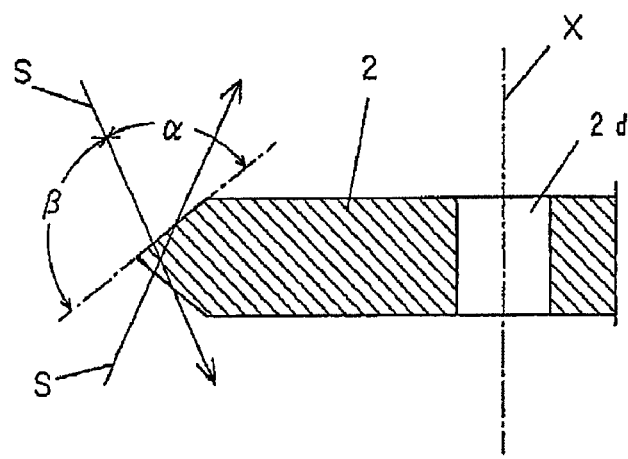
FIG. 14 View showing an embodiment of prevention of "a scooped hollow".
Figure 22:
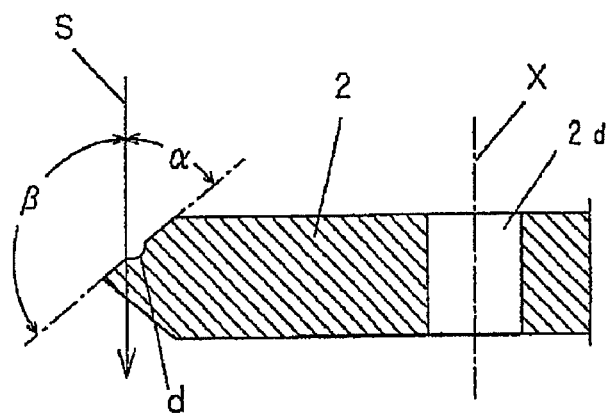
FIG. 22 Cross section showing "a scooped hollow" when a groove site is processed FIG. 23 Views showing another conventional wheel to be processed by laser and a processing configuration including a base plate and a laser unit

FIG. 14 shows an embodiment in which measures are taken to eliminate the above-mentioned "scooped hollow" (see FIG. 22). In this embodiment a groove is irradiated with a laser beam from both sides of the wheel 2 alternately or at the same time. In this case beam direction is formed with the predetermined bevel so that irradiation of the laser beam can get in close with X-axis of a wheel (a conventional example shown in FIG. 22 is irradiated with a laser beam parallel to axis of a wheel). The predetermined bevel means the bevel (from the side parallel to X-axis of a wheel): α becomes larger, β becomes smaller and the difference between α and β becomes reduced, and angles α and β become close to each other. By this bevel angle α between upper side of bevel in respect to irradiation line of a laser beam S and irradiation line of a laser beam S is getting close to angle β on lower side of bevel, which prevents the upper side from more irradiation heat and avoids forming "a scooped hollow".

According to the present invention of the method for manufacturing a cutter wheel for a substrate made of a brittle material, uniformity of an energy distribution on the exterior edge of a section in the direction perpendicular to optical axis of a laser beam is measured, and a piece of work is processed by using specific position of the exterior edge of a section of the laser beam depending on the results (hereinafter referred to as "directions for use of specific position").

Figure 15:
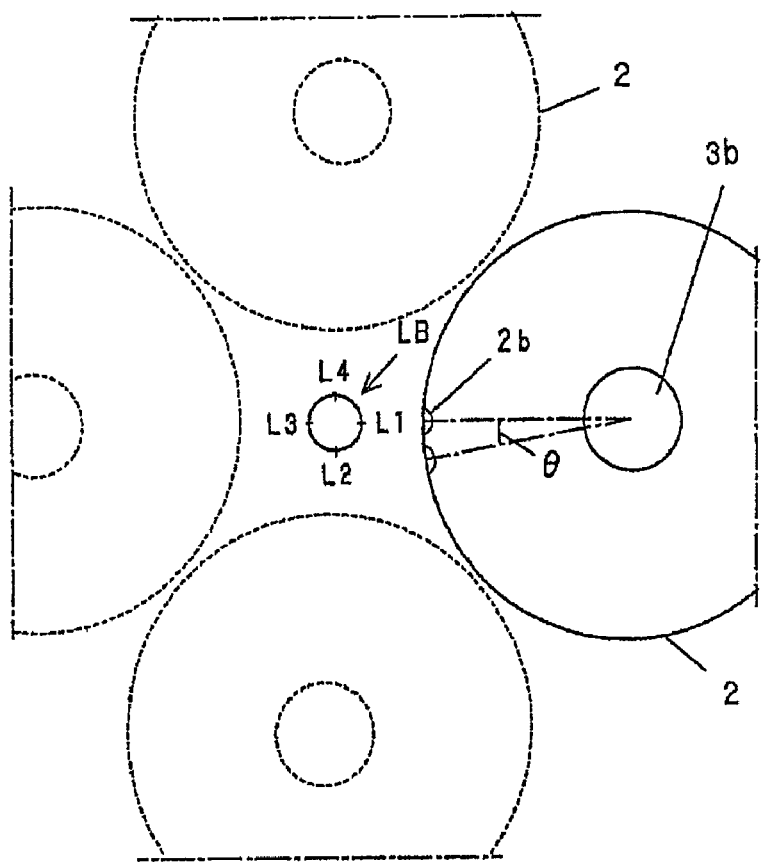
FIG. 15 Plan view explaining how to form a groove of a wheel supported on an X-Y axis moving stage by use of "directions for use of specific position".

Hereinafter the embodiments of "directions for use of specific position" will be described with reference to practical examples shown in FIG. 4 to FIG. 6 and FIG. 15. FIG. 15 is a plan view of a fixed base 2 for describing how to form a groove 2b by use of "directions for use of specific position".

When a wheel to be processed is put in a stationary condition on a moving stage 3a with X-Y axis, and a laser beam is relatively irradiated along the circular arc trajectory R towards the outer circumference, including ridge 2a, from the side of the wheel 2, as shown in FIG. 5 and FIG. 6, a part of the circular arc trajectory is set so as to get in tough with the ridge 2a, and circular arc groove 2b is formed, as shown in FIG. 6.

In reference to FIG. 15, in order to form the first groove 2b a wheel 2 held by a rotation axis 3b (see FIG. 2) on a stage 3a with X-Y axis (see FIG. 2) is approximated toward a laser beam LB irradiated from a laser head 1 (for example, a laser beam is put in opposed position of outer circumference of a wheel which is shown in full line in the drawing) and the circular arc groove 2b is formed. Then, the wheel 2 held by rotation axis 3b is put away from the laser beam LB, the rotation axis 3 b is rotated by angle θ and the wheel 2 is approximated to the laser beam LB and the second groove 2b is formed on outer circumference of the wheel which is put in the opposed position L1. By repeating such operations n-numbers of grooves 2 are formed on the outer circumference of the wheel 2 at predetermined intervals.

At this time the laser beam LB is so irradiated to the ridge 2a that the ridge 2a is irradiated by the same angular position L1 of the peripheral part of the cross section intersecting by a right angle with the optical axis of the laser beam LB.

On the other hand, the form of a laser beam is not a perfect circle and energy distribution on the outer of section in a direction perpendicular to the optical axis of a laser beam LB is not always uniform all around.

When energy distribution at the exterior edge of the laser beam is low, for example, in the angular position L1, there will be a problem that moving trajectory cannot be drawn as expected, while the laser beam is moved relatively on the assumption that energy distribution at the exterior edge of the laser beam is uniform.

Therefore, one embodiment preventing the above trouble by use of "directions for use of specific position" will be described hereinafter.

First a test piece is held by the rotation axis 3b on the moving stage 3a with X-Y axis (see FIG. 2) in FIG. 15. The material and shape of the test piece is the same as wheel 2.

The test piece is irradiated with a laser beam LB from a laser head 1, while being moved relatively so as to make a drawing, for example, such a drawing as on a work piece. The processed portion by the laser beam is observed through, for example, a microscope and the uniformity of energy distribution perpendicular to optical axis of the laser beam LB is examined on the base of the results of the observation, i.e. when the deviation from the planed processing line and the existence of boundaries, where processed site and non-processed site are mixed, are observed in the processing site, instead of angular position L1 of outer circumference, in the other different positions of the laser beam LB by which the processing site is irradiated, for example, positions L2 to L4 in the drawing, the same action is done: the test piece is irradiated with a laser beam LB from a laser head 1, while being moved relatively to the test piece so as to make a drawing. The site which is processed by the laser beam is observed through a microscope and the uniformity of an energy distribution perpendicular to the optical axis of the laser beam LB is examined on the base of the observation.

When such problems as above are not found in the processed site, the angular position of outer circumference of the laser beam, by which the processing site is irradiated, is regarded as "specific position" of, for example, any position of the above L2 to L4. By use of the specific position the wheel 2 is processed.

Concretely, the wheel 2 is held by a rotational shaft 3b on the moving stage 3a with X-Y axis, is moved relatively. to the position opposed to the "specific position" of laser beam LB irradiated from the laser head 1. Then, the moving stage with X-Y axis is moved so as to draw an enclosed shape, while the "specific position" of the laser beam LB is getting in touch with the processing site of the wheel 2, and processing of grooves of the wheel 2 is done. After finishing the first processing of the groove, the rotational shaft is rotated by a predetermined angle θ (one pitch). A moving stage 3a with X-Y axis is moved so that it can draw an enclosed shape on the processing site next to the processing site formed by the above processing, and so that the "specific position" of the laser beam LB can be touched with pressure. Afterwards n-number of the same action is repeated.

By use of "directions for use of specific position" a work piece is irradiated by a constant uniform energy distribution of the laser beam LB and touches a laser beam LB through outer circumference with constant curvature. Therefore, the problem that moving trajectory R of the laser beam LB such as enclosed shapes or something expected cannot be drawn is resolved.

A wheel 2 for a substrate made of a brittle material processed by the manufacturing method according to the present invention can be processed effectively, if its specifications are within the following range: a V-like shape ridge with an angle of 85 to 160 degrees, an outer diameter of the wheel 1 to 20 mm, thickness of wheel is no more than 5 mm, a length of protrusion and groove 5 to 200 μm, height of protrusion 0.5 to 20 μm.

In addition, it was possible to avoid graphitization of the fine processing site almost completely and obtain precise processing shapes in the laser fine processing of sintered diamond shown in the best embodiment of the invention to be executed.

Experiments

We made a Raman spectroscopic analysis on wheels for a substrate of a brittle material produced both by a traditional grinding processing using a grindstone and by a laser processing according to this invention. Both of the wheels are made of the same sintered diamond, same in size and in shape (diameter 2 mm, thickness 0.65 mm, angle of cutting edge 115°). Moving trajectory of a laser which forms grooves is a circular shape with diameter 48 μm, and wheels were set so that circular arc with length 7 μm can be cut into the wheel.

Table 1 shows measurement conditions of Raman spectroscopic analysis.

TABLE 1

| | |
|---|---|
| Analysis equipment | Laser Raman spectroscopic analyzer |
| Probe of injection | Laser |
| Detection signal | Scattering ray |
| Limit of resolution (space/depth) | 1 μm/100 nm |
| Accuracy | a few % |
| Light source | He—Ne laser |
| Magnification | 50 times (Microscopic Raman) |

FIG. 16(*a*) and FIG. 16(*b*) show by arrows directions of incident radiation to the wheel 2'. FIG. 16(*c*) shows measurement points P1 and P2.

Table 2 shows measurement conditions of laser processing in accordance with the present invention.

TABLE 2

| | |
|---|---|
| Maximum output | 10 W @10 KHz/25 ns@10 KHz |
| Lens | Objective lens Focus lens f = 10 mm |
| Defocus/Diameter of beam | 0 μm/4 μm |
| Blow/Blow flow | Air (cooling −5° C./20 L/min. |
| Form of processed piece | Φ 2 × 0.65 115° |
| Power/Repetition | 0.3 W/500 Hz |
| Scanning speed | 0.5 mm/sec |
| Size of processing | Trepanning Φ 48 μm Cut-in 7 μm |

"Defocus/Diameter of beam 0 μm/4 μm" in Table 2 show that diameter of beam on the processing is stopped down up to 4 μm when it is focused on ridge 2*a* of the wheel 2.

Figure 19:
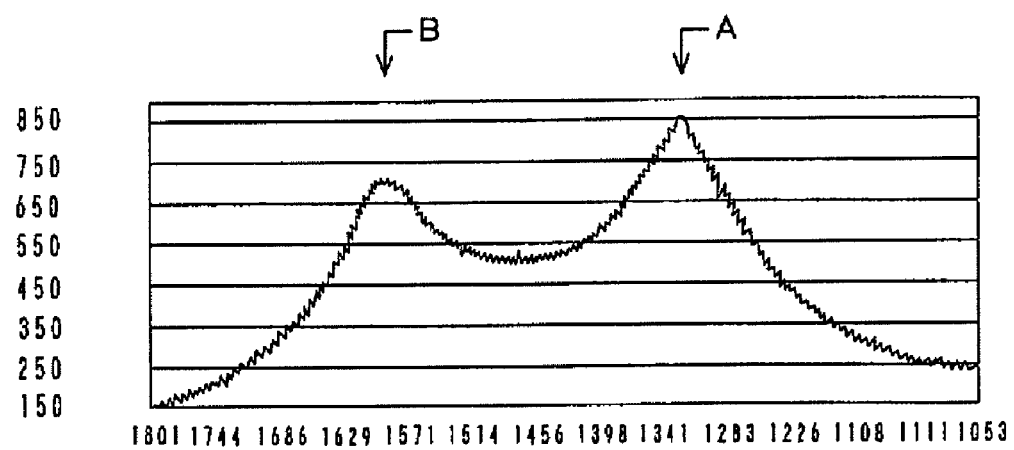
FIG. 19 View showing experimental results of a Raman spectroscopic analysis on wheels formed by the conventional laser processing.

FIG. 17 shows results of Raman spectroscopic analysis on the grooves which are formed by a grindstone of existing method. FIG. 18 shows results of analysis of wheels which are formed by the method according to the present invention. FIG. 19 shows results of analysis of wheel which are formed by a conventional laser method.

In FIG. 17 to FIG. 19 the horizontal axis represents a frequency of scattered light and the vertical axis represents an intensity of Raman scattered light. A peak A shows Raman shift of diamond (1332.5 $cm^{-1}$) and peak B shows Raman shift of graphite (1580.0 $cm^{-1}$).

FIG. 17 (*a*) shows the results of Raman spectroscopic analysis at the reading point P1 shown in FIG. 16 (*c*). FIG. 17 (*b*) shows the results of Raman spectroscopic analysis at the reading point P2 shown in FIG. 16 (*c*). As is clear from these results, fine processing according to the existence grinding processing is possible for grooves without graphitization on the surface of wheel FIG. 18(*a*) shows result of Raman spectroscopic analysis at the reading point P1 shown in FIG. 16 (*c*). FIG. 18(*b*) shows result of Raman spectroscopic analysis at the reading point P2 shown in FIG. 16 (*c*). As is clear from these results, fine processing according to the processing method of the present invention is possible for grooves without graphitization on the surface of a wheel as in the case of the conventional method.

FIG. 19 shows the results of Raman spectroscopic analysis on the wheels which do not meet the range of conditions of laser processing described in the present invention: a laser beam with a wavelength of 355 nm, power 5.0 W, width of laser pulse 25 n/sec, repetition of frequency 10 KHz is irradiated to the processing site of the wheel with thickness of processing site 10 μm at relative moving speed of 0.5 mm/sec of a laser beam to the wheel. Reading point is P1 in FIG. 16(*c*).

Graphitization is observed clearly under this condition. When processing conditions do not meet those of the present invention, graphitization is also observed under the other conditions.

As seen in these results, laser processing in compliance with the conditions of the present invention can prevent progress of graphitization by laser processing as much as traditional grinding processing.

Other Practical Examples

According to this manufacturing method of a cutter wheel for a substrate made of a brittle material it is possible to draw a required moving trajectory on a wheel by accurate relative displacement of a laser beam in the following construction: the wheel is supported through a supporting means equipped with such three sites as the site roughly adjusting movement of a wheel movable in the direction of at least two axes, the site finely adjusting movement of the wheel movable in the direction of at least two axes on the above-mentioned rough adjusting and the rotary supporting site of the wheel movable at a required angle, and then the laser beam is irradiated to the processing site, while moving the laser beam relative to the wheel (hereinafter called as "directions of use of nano-stage").

One embodiment of "directions of use of nano-stage" will be described in reference to FIG. 20.

Figure 20:
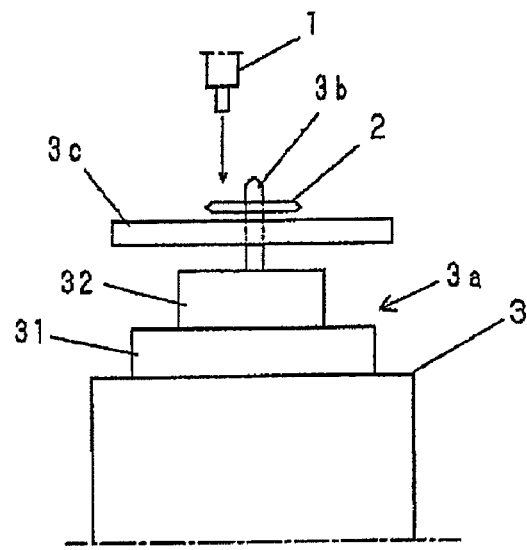
FIG. 20 View showing a nano-stage used in accordance with "directions of use of nano-stage".
Figure 21:
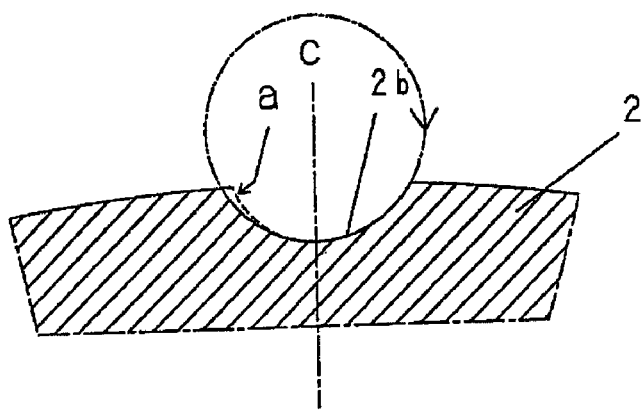
FIG. 21 Cross section of a groove site showing "asymmetry" phenomenon when it is processed.

FIG. 20 is the drawing which is applied for "directions of use for nano-stage".

The stage 3*a* with X-Y axis shown in FIG. 2 is the stage which can be adjusted movably in the directions of X-axis and Y-axis, but nano-stage shown in FIG. 20 differs in the composition: unit 31 roughly adjusting movement in the directions of X-axis and Y axis and a unit 32 finely adjusting movement in the directions of X-axis and Y axis on the unit 31. Other composition is in common and is skipped here.

It is more preferred that the nano-stage can be movable to an accuracy of ±0.1 μm to ±0.5 μm, when the beam is moved towards the outer circumference, including ridge 2*a*, from the side of the wheel 2 in the static condition of the wheel to be processed, for example, is irradiated with along the round trajectory of diameter 10 μm.

By use of nano-stage it is possible to make a desired drawing (a moving trajectory) on the above-mentioned wheel, moving accurately a laser beam relatively.

INDUSTRIAL APPLICABILITY

The present invention is available for the production of wheels which form accurate scribing lines on panel substrates made of such a brittle material as glass, ceramics, monocrystal silicon or sapphire and substrates of such flat pane display as liquid crystal panels, plasma display panels, organic EL display panels. The wheels according to the present invention have features that the wheel is capable of generating a vertical crack deep inside the substrate and/or is capable of better biting the surface of a substrate.

In addition to the conventional wheel shown in FIG. 4 as a starting work piece for additional fine processing in accordance with the present invention, it is also possible to employ another conventional wheel shown in FIG. 23. It is a scribing wheel 41 formed by combining a main body and a shaft so as to one integral wheel. A part of the wheel corresponding to the shaft of the wheel shown in FIG. 4, is placed on a plate provided with a concave part and then is sucked by use of a vacuum suction pipe 5 in order not to be moved. Accordingly, the integral wheel 41 is so situated as shown in FIG. 23(*b*), similar to the case shown in FIG. 2, and then a peripheral ridge of the wheel 41 is processed by use of a laser beam. It is thus possible to produce a wheel which is provided with a superior scribing performance, similarly to the case of the wheel in FIG. 4.

The invention claimed is:

1. A production method of a scribing wheel with ground surface irregularities and for a substrate of a brittle material by use of a laser beam comprising steps of;
   a) working a bulk material of sintered diamond so as to form a radial ridge by forming two bevelled surfaces converging said radial ridge,
   b) irradiating a laser beam onto a portion of said radial ridge, and
   c) successively forming a plurality of grooves having openings in radial directions with a predetermined pitch and within a depth of 200 micrometer through a laser ablation process, wherein a first part of a groove is formed by a first irradiation from a first edge of said groove in a first direction by moving said laser beam relative to said scribing wheel, and a second part of said groove other than said first part is formed by a second irradiation from a second edge of said groove in a second direction opposite to said first direction by moving said laser beam relative to said scribing wheel, wherein
      a wave length of said laser beam is between 125 and 1066 nm,
      a pulse width of one pulse is between 5 fsec, and 50 nsec., and
      a repetition cycle is between 300 Hz and 5 kH.

2. A production method of a scribing wheel with ground surface irregularities and for a substrate of a brittle material by use of a laser beam in accordance with claim 1, wherein a speed of a displacement movement of said laser beam relative to said work piece to be said scribing wheel is between 0.1 micrometer per sec. and 3.0 mm/sec while irradiating said laser beam onto a specified working point of said work piece.

3. A production method of a scribing wheel with ground surface irregularities and for a substrate of a brittle material by use of a laser beam in accordance with claim 1, wherein a pattern formed by displacement movement of said laser beam relative to said scribing wheel is a figure with a pattern.

4. A production method of a scribing wheel with ground surface irregularities and for a substrate of a brittle material by use of a laser beam in accordance with claim 3, wherein said pattern is a pattern selected from the group consisting of a straight line, an unclosed line and a closed line selected from the group consisting of a circle, an ellipse and a polygon.

5. A production method of a scribing wheel with ground surface irregularities and for a substrate of a brittle material by use of a laser beam in accordance with claim 4, wherein
   (a) a pattern formed by moving trajectory of said laser beam relative to said scribing wheel is controlled by sliding in a radial direction of said scribing wheel for adjusting a depth of grooves to be formed, and
   (b) a size of a pattern formed by moving trajectory of said laser beam relative to said scribing wheel is controlled by changing for adjusting a length of grooves in a radial direction.

6. A production method of a scribing wheel with ground surface irregularities and for a substrate of a brittle material by use of a laser beam in accordance with claim 1, wherein said moving trajectories of said laser beam relative to said scribing wheel is closed curves in said first and said second irradiation of said laser beam, and said closed curves are shifted each other in a circumference direction.

7. A production method of a scribing wheel with ground surface irregularities and for a substrate of a brittle material by use of a laser beam in accordance with claim 1, wherein said moving trajectories of said laser beam relative to said groove is arcs of circles, and sizes of said arcs of said circles are different from each other.

8. A production method of a scribing wheel with ground surface irregularities and for a substrate of a brittle material by use of a laser beam in accordance with claim 1, wherein processing contour curves of grooves to be formed are divided into two parts, and said divided parts are processed by said first and said second irradiation of said laser beam.

9. A production method of a scribing wheel with ground surface irregularities and for a substrate of a brittle material by use of a laser beam in accordance with claim 1, wherein said grooves are processed by irradiating a laser beam alternatively from a right side and left side of said scribing wheel, or irradiating a laser beam simultaneously from both sides of said scribing wheel.

10. A production method of a scribing wheel with ground surface irregularities and for a substrate of a brittle material by use of a laser beam in accordance with claim 9, wherein said laser beams are irradiated from both sides of said scribing wheel with predetermined angles to an axial line of said scribing wheel.

11. A production method of a scribing wheel with ground surface irregularities and for a substrate of a brittle material by use of a laser beam in accordance with claim 1, wherein uniformity of an energy distribution of said laser beam at a peripheral portion of cross-section perpendicular to optical axis of said laser beam is measured, and said work piece is processed at a specified place at the peripheral of said laser beam.

12. A production method of a scribing wheel with ground surface irregularities and for a substrate of a brittle material by use of a laser beam in accordance with claim 1, wherein (1) said scribing wheel is supported by a supporting means comprising (i) a rough adjusting moving unit roughly movable at least in two axial directions, (ii) a fine adjusting moving unit minutely movable at least in two directions on said rough adjusting moving unit, and (iii) a rotational supporting unit for supporting said scribing wheel rotatably by a predetermined angle on said fine adjusting moving unit, and (2) said laser beam is irradiated onto a processing part of said scribing wheel while moving said laser beam relative to said scribing wheel.

13. A production method of a scribing wheel with ground surface irregularities and for a substrate of a brittle material by use of a laser beam in accordance with claim 1, wherein said laser beam is consisting of high harmonics of second to fifth orders of YAG laser.

14. A production method of a scribing wheel with ground surface irregularities and for a substrate of a brittle material by use of a laser beam in accordance with claim 1, wherein said laser beam is irradiated onto a portion of said radial ridge in a direction such that an optical axis of said laser beam is perpendicular to a radial direction of said scribing wheel and parallel to an axis of rotation of said scribing wheel.

15. A production method for producing a scribing wheel for a brittle material substrate, comprising the steps of:
 providing a wheel made of sintered diamond having a V-shaped ridge around an outer periphery, and
 forming a plurality of fine notches at desired intervals around a periphery of the V-shaped ridge of the wheel, each of the fine notches being formed by a high-precision laser ablation process by irradiating a portion of the periphery of the V-shaped ridge of the wheel with a laser beam while moving the wheel or the laser beam, wherein the laser beam is irradiated onto the portion of the periphery of the V-shaped ridge in a direction such that an optical axis of the laser beam is perpendicular to a radial direction of the wheel and parallel to an axis of rotation of the wheel, and a maximum thickness of the portion of the periphery irradiated with the laser beam is 200 micrometers, wherein a first part of each notch is formed by a first irradiation from a first edge of notch in a first direction by moving the laser beam relative to the wheel, and a second part of the notch other than the first part is formed by a second irradiation from a second edge of the notch in a second direction opposite to the first direction by moving the laser beam relative to the wheel, and wherein a wave length of the laser beam is between 125 and 1066 nm, a pulse width of one pulse is between 5 fsec, and 50 nsec., and a repetition cycle is between 300 Hz and 5 kH.

16. The production method according to claim 15, wherein a speed of a displacement movement of the laser beam relative to the wheel is between 0.1 micrometer per sec, and 3.0 mm/sec.

* * * * *